June 28, 1938.  R. H. KRESS  2,122,067
RIM RELEASE OIL CLUTCH
Filed Sept. 28, 1934    2 Sheets-Sheet 1

INVENTOR
Ralph H. Kress
BY
Gordon W. Daron
ATTORNEY

June 28, 1938.  R. H. KRESS  2,122,067
RIM RELEASE OIL CLUTCH
Filed Sept. 28, 1934  2 Sheets-Sheet 2
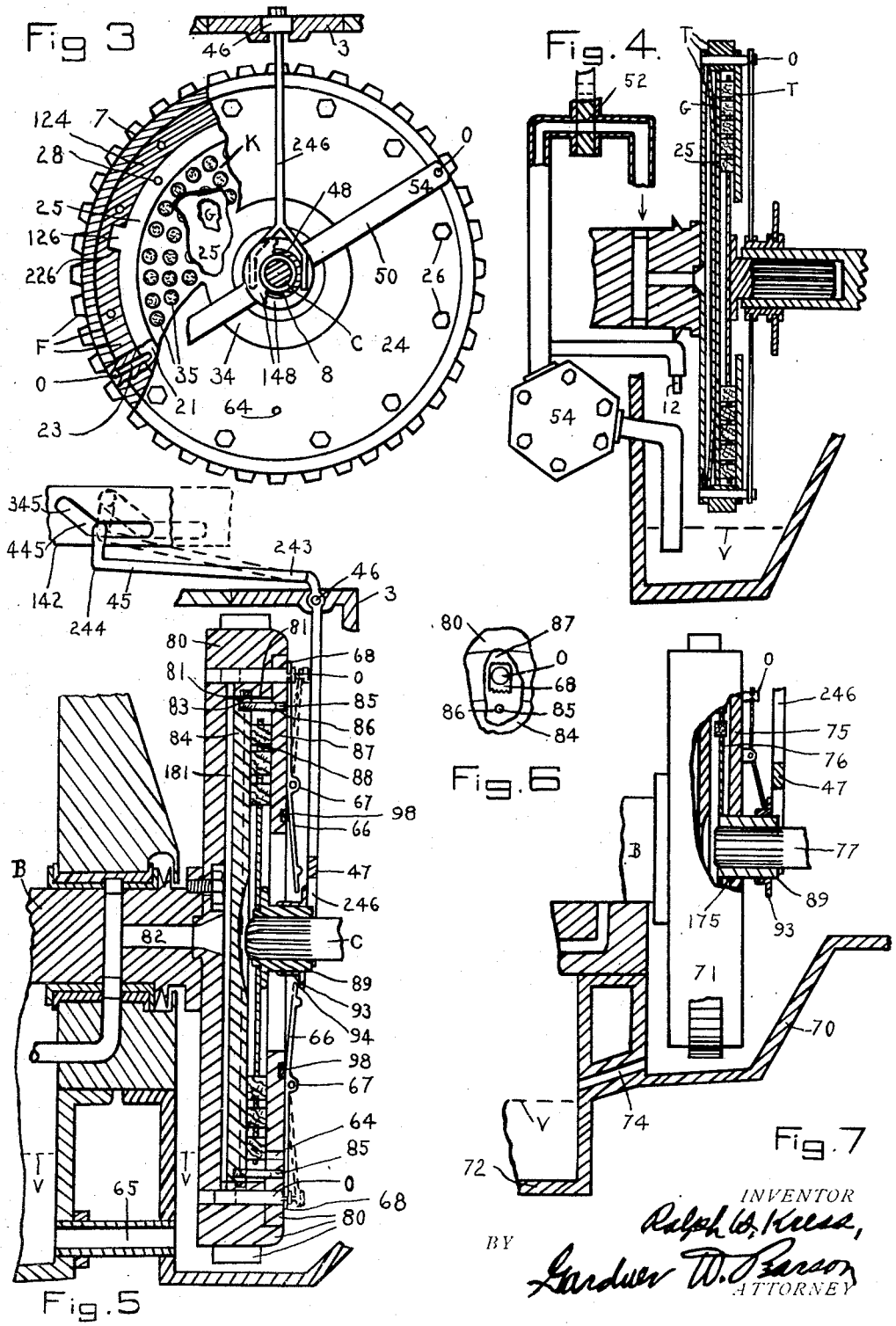
INVENTOR
Ralph H. Kress,
BY
Gardner W. Pearson
ATTORNEY Patented June 28, 1938

2,122,067

UNITED STATES PATENT OFFICE 2,122,067

RIM RELEASE OIL CLUTCH

Ralph H. Kress, Lawrence, Mass., assignor to Patent Protection Corporation, Lowell, Mass., a corporation of Massachusetts, trustee Application September 28, 1934, Serial No. 745,878

4 Claims. (Cl. 192—85)

This invention relates to the control of automobiles and is of a similar type to that shown in the United States Letters Patent on Oil pressure automobile clutch control, issued to me December 12, 1933, No. 1,938,914.

The control of an automobile must be more delicate and certain than the control of an explosive engine of the stationary type or even one used in boats.

While this device might be used in other mechanisms, its particular use is in automobiles to replace the mechanically operated clutches now in common use.

I prefer to utilize the oil pressure lubricating system, now common, which includes a pump, a conductor from the crank case or bottom of the engine casing, conductors to bearings in the crank case, a discharge or overflow pipe to the crank case, a pressure valve in such pipe which opens at a certain pressure and determines the maximum pressure of oil to the bearings, but I can use an independent pump with no connection with the bearings, if desired. I may also use an auxiliary power or hand pump.

I am aware that self-contained oil operable clutches have been devised wherein there is a pump and other devices forming part of the clutch or carried by the clutch by which the same oil is used repeatedly to operate a piston or diaphragm to engage clutch plates.

This device includes a motor crank shaft and a clutch shaft alined end to end each carrying some of the clutch members, one of such members including an oil pressure chamber connected with an oil pressure system operable by a pump, which is entirely outside the clutch, and controlled by a pressure valve in the connection between this oil pressure chamber and the oil pressure system.

To get the desired pressure in a comparatively small space, it has been found desirable to use a diaphragm or piston the center of which is the center of the drive shaft in place of a series of pistons around the rim or other devices of a different character.

It has been found, however, that where a liquid such as oil is used in place of a fluid, such as air or exhaust gases, at high speeds, the centrifugal force of the rapidly revolving drive shaft and clutch member, whether a fly wheel or other device, in which is the pressure chamber, throws the oil out to the rim with such force that when the oil pressure from the pump or tank is shut off, it is not practical to have springs powerful enough to disengage the clutch plates.

In my Patent No. 1,938,914 I show the use of centrifugal governors the purpose of which is to neutralize this centrifugal force, but in this device, I use an oil pressure release valve at the rim of the pressure chamber operable mechanically and not automatically by suitable rods and levers or other mechanical devices which connect with the control rods and other devices for operating the oil pressure valve so that when the oil pressure is shut off, this release valve is opened and the centrifugal force drives the oil out through the pressure release passage not only relieving the centrifugal pressure which tends to cause the clutch plate to engage, but actually producing a suction which sucks the active clutch plates away from the passive clutch plates whereby any return springs can be entirely done away with. In this device, the centrifugal force is not neutralized, but is released and actually utilized to take the place of return springs.

A clutch control system of this type does away entirely with a great many of the yokes, springs and other devices of the mechanical clutch thus greatly simplifying the construction and permitting a much more compact assembly.

The rim relief outlet passage and valve are positioned not radially with reference to the axis of rotation of the clutch, but are substantially parallel with this axis so that the valve is not affected by the centrifugal force of the revolving clutch no matter what the speed may be. This valve is positively and mechanically connected at the outside of the clutch casing with the inlet valve and control means so that when one valve is open, the other is closed.

Preferably I use a diaphragm as an active clutch plate operating member, but may also use a piston and while I prefer to use light auxiliary return springs cooperating with the suction produced as indicated, I can obviously use heavy auxiliary springs or none at all.

I also find it convenient to use a pneumatic pressure tank as part of the oil clutch operating system so as to store up oil pressure for use when the engine is stopped and it is desired to engage the clutch for any purpose.

As with this construction, the oil does not go back through a three way valve, being controlled by any type of valve which can start or stop the flow of oil from the pressure system, but does go through the clutch and out into the clutch casing, if the clutch is of the wet or semi-wet type, the clutch plates must be of a type which will operate in more or less oil. A dry clutch may be used, however.

In the preferred type, the oil discharged from the clutch is picked up and returned to the engine casing in such a way that the clutch casing is reasonably dry, but they may be connected at the bottom so that the oil level in each casing is substantially the same.

The principal characteristic of my invention is the passing of a stream of oil or other suitable medium under pressure into an oil pressure chamber behind a clutch member in a revoluble fly wheel or revoluble clutch casing so that it will move such clutch member into engagement with other clutch members, and providing, at or near the rim or outside of the oil pressure chamber, a release valve which is connected with or operative in coordination with the valve or other means for controlling the oil stream.

This controlled oil stream, instead of going into the pressure chamber and then back again through some conductor, goes through the clutch casing and out at the rim when the pressure control valve is closed and the release valve is opened and from there goes by gravity or otherwise to a reservoir, which may be the bottom of the motor casing or the bottom of the clutch casing, or some other suitable receptacle, from which it is sucked by any kind of a pump, either that which operates the lubricating system, an independent power pump or a hand pump, back to the pressure oil stream.

Preferably I provide a pneumatic pressure tank to store up the pressure for emergencies. If the usual type of rotary or any positive action oil pump is used, there is and should be the usual relief valve which permits any surplus oil under pressure to go back into the reservoir.

I may use a diaphragm or piston, the center of which in either case is the center of the respective shafts which are to be connected, and the clutch may be what is known as a dry or a wet clutch.

The clutch can be so made that there are no springs, either to return the clutch plates to the disengaged position or in connection with either valve, but preferably, according to the purpose desired, springs can be used in the clutch proper and in connection with the valve controlling the oil stream.

While normally the oil pressure chamber would be in a fly wheel or similar revoluble member attached to and carried by the motor crank shaft, it might be greatly reduced in weight so as to have little effect as a fly wheel and it might be attached to the clutch or driven shaft and the control members for the release valve might be on either side of the clutch.

In the drawings, Fig. 1 is a side elevation partly in section and partly diagrammatic showing the motor or engine of an automobile together with the clutch, gear shift and other well known parts to which this invention is applied.

Fig. 3 is a rear elevation partly in section of the rear of the clutch shown in Figs. 1 and 2, the rear being the part towards the rear of the automobile.

Fig. 4 is a longitudinal vertical sectional view similar to parts of Fig. 2 showing a modification of the construction, some parts being in full lines and others in section.

Fig. 5 is a view similar to Figs. 2 and 4 of still another modification.

Fig. 6 is a detail view showing the pin connections between the active and passive clutch plates.

Fig. 7 is a side elevation partly in vertical longitudinal section of still another modification of construction.

Figure 1:
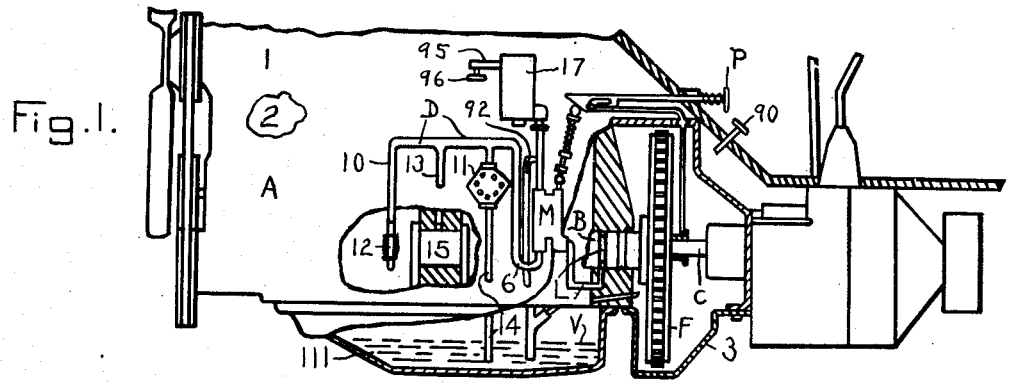

In the drawings, A represents part of an automobile which would naturally include wheels, steering gear and other parts and particularly a motor casing 1 and motor 2 therein together with a stationary clutch casing 3. There is also an oil passage from the clutch casing to the drip pan 111 at the bottom of the motor casing 1 and a motor crank drive shaft B and a clutch shaft C, the ends of which approach each other and are alined in the stationary clutch casing 3.

This automobile is equipped with any of the well known types of oil pressure lubricating systems indicated by D which includes an oil pump 11 with discharge pipe 6, conductors 13 to the various bearings 15 which are to be lubricated, a pressure valve 12 in a discharge or overflow pipe 10 whereby when the pump pressure exceeds the predetermined maximum, valve 12 opens and any excess oil is discharged into the crank casing 111 forming the bottom of the motor casing or engine casing 1.

The bearings 15, 15 are loose or open enough to permit the oil to slowly be forced through them back into the motor casing. 14 is an inlet pipe or conductor for the oil pressure system and through it, oil is constantly sucked from the bottom of the engine casing. 16 is a pipe from the pipe 6 to an air pressure oil storage tank 17 and 18 is a trap valve which permits oil to enter the tank, but does not allow it to return, but through oil pressure control passage L, it can go to the clutch when clutch control valve M is opened.

V represents the oil level in all views.

F represents a revoluble active clutch casing, which ordinarily would be the fly wheel, carried by the drive shaft B which is the motor or engine crank shaft. In this fly wheel or revolving clutch casing F is a circular pressure chamber 21 which is shown as closed by an active oil pressure operable clutch member G which is shown in Figs. 1 to 4 as a diaphragm.

Diaphragm G rests in a circular recess 7 larger than 21 and is held and clamped in place by rings 124 and 24 and screws 26, 26. This member G is operable or movable with an active clutch plate 25 when oil pressure is introduced into the chamber 21 through the clutch control oil passage L.

If plate 25 is fastened to diaphragm G, it will return with the diaphragm, but if it is not so fastened, I find it desirable to use light returning springs 28, 28. These springs, however, may be omitted so that the clutch is actually a springless clutch.

I may use an ordinary two way or one direction valve, as shown in Fig. 4 to control the flow of oil from the pump 11 or tank 17 to the clutch, but prefer to use a special combination one direction valve M located in a suitable position in clutch control oil passage L. Such a valve is opened and closed by suitable control means P within reach of the operator of the automobile.

As shown, such means includes a button 40 located in the foot board 5 within convenient reach carried by a push rod 140 which is slidable through bearings 141, 141 and terminates in a cam member 142. Returning spring 143 is of the compression type and tends to return rod 140 to its normal position. Cam member or head 142 slidably engages the top end 241 of a rod 41 which, as shown, is jointed at 242 near valve M and opens or closes that one direction valve.

Bell crank lever 45 is pivoted at 46 to clutch casing 3, one arm 246 being inside and the other 243 being outside and bent at 244 and at 245 to engage a groove 345 in cam 142 so cut that as face 341 moves rod 41 down, it moves arm 243 up.

The forked end 47 of inside arm 246 fits between flanges 148, 148 on a collar 48, slidable on a hub 8 which is itself axially slidable on and revoluble with clutch shaft C. Collar 48 which carries arm 50 moves positively back and forth simultaneously with the movement of valve M.

Revoluble with active clutch member F is the pressure release valve control arm 50 which also straddles sliding collar 48 between flanges 149, 149 and extends out in each direction radially, its outer ends 54, 54 being fixed to the stems 53, 53 of oil pressure release valves O, O located in oil release passages 23, 23 at or near the outside rim of the oil pressure chamber 21.

These valves O, O are preferably of the pin type because their movement is at right angles to the centrifugal pressure of the oil and they can be opened or closed at very little pressure.

Preferably there are two or an even number of such oil release valves to balance the parts, but obviously one valve might be used and while I prefer to locate them just outside of the effective edge of the diaphragm or cylinder, it or they may be located near the outside.

The extent and kind of movement of valves M and O can be changed by the shape of cam parts 341 and 345.

To produce the opposite movement of lever 45 as in Fig. 5 the groove 345 in cam head 142 is cut with the opposite slope as at 445 in Fig. 5.

Clutch shaft C carries a passive clutch member K which is shown as a disc 34 fixed to hub 8 and carrying a plurality of friction plugs 35, 35 all being revoluble with the clutch shaft C.

Figure 2:
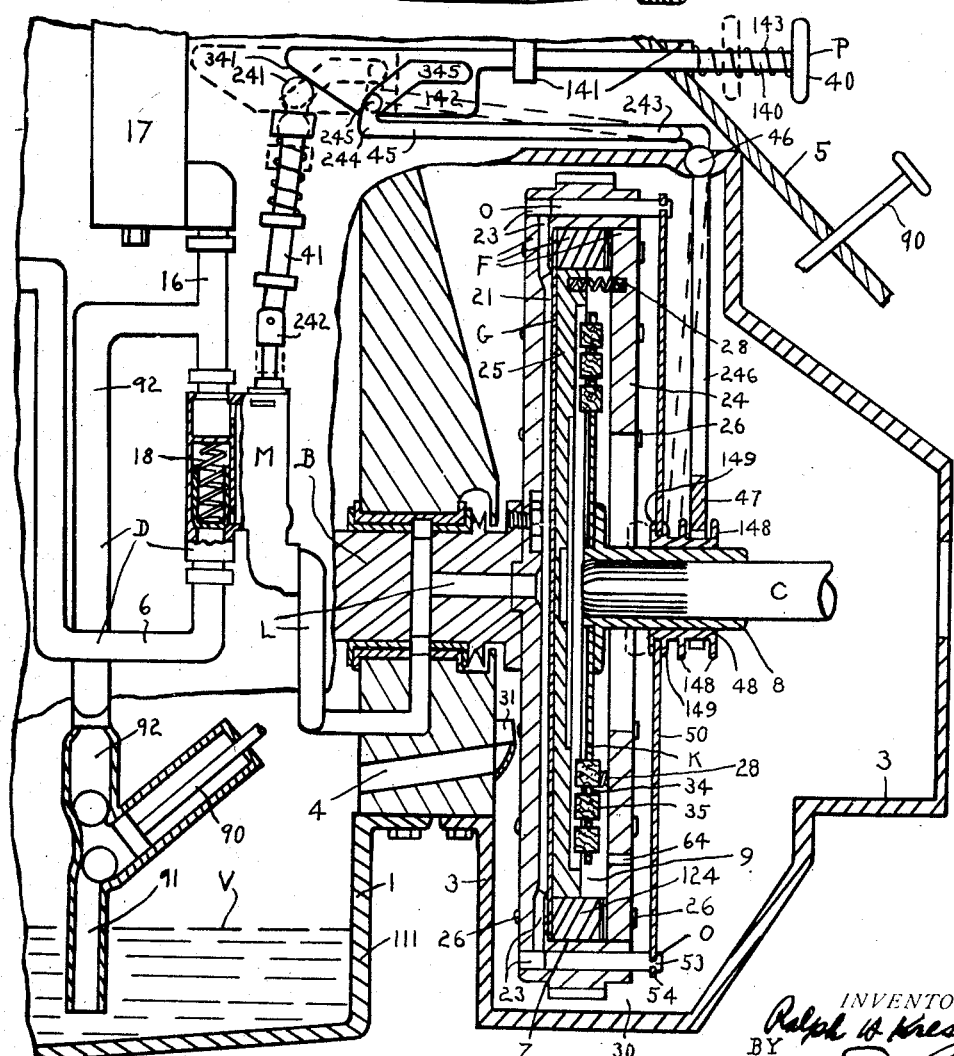
Fig. 2 is an enlarged side section elevation showing part of the engine or motor casing, the clutch casing and clutch and the most important parts embodied in this invention some parts being shown in section and others in elevation for clearness.

In the construction shown in Figs. 2 and 3, there are rings 124 and 24 fixed to and forming part of the active clutch member F by means of screws 26 and this forms an annular pocket in which the passive clutch member K is located. As oil is likely to gather in this pocket and be thrown to the outside, it interferes with the operation of the active clutch member unless I use drains such as 64 which extend out from this pocket in such a way that practically all of the oil is thrown out by centrifugal force. There may be a small amount left, however, which helps the vacuum created in the oil pressure chamber and the springs, if springs are used, in disengaging the active clutch member from the passive clutch member and thus disengaging the clutch.

The compression springs 28 are preferably used and act as returning springs for the active clutch pressure operable member G. While the parts may run submerged in oil, I prefer a construction in which the oil passages 4, 4 between the stationary clutch casing 3 and the motor casing 1 are located a quarter way up and revolving clutch member F runs in a trough 30 formed by the lower sides of the clutch casing 3 and I provide a gutter 31 on the motor side from which the passages 4, 4 lead to the motor casing 1. The result is that as member F revolves at a very high rate of speed, it lifts up the oil from the bottom of the trough 30 and spatters it into the gutter 31 from which it runs back into the motor casing 1.

The operation is as follows:

When it is desired to engage the clutch plates, the button 40, or other controlling member, is depressed. If the rim release valve O is open, this movement closes it and the continuation of the movement opens the oil pressure valve M thus allowing oil under pressure to move the active clutch member into engagement with the passive clutch member, thereby causing the clutch shaft or driven shaft C to revolve with the engine, motor shaft or drive shaft B. When valve M is fully opened, the face 341 and the groove 345 are so cut that the two valves will remain respectively in the open and closed positions. The timing of the valves is, therefore, controlled by the cutting of the grooves 345 or 445 and the face 341 of cam 142. The oil under pressure flows from the pressure lubricating system D, impelled by the pump 11 or by the air pressure in the tank 17, into the oil pressure chamber 21 actually squeezing passive clutch member K between the parts 24 and 25 of member F.

When it is desired to release the clutch, the button 40 is released and the springs 143 and 145 return the rods 140 and 41 to their normal positions closing valve M and this action is transmitted through the lever 45 to 47, sliding collar 48 to the arm 50 and its ends 54, 54 which opens the oil pressure release valves O, O and allows the oil to be thrown out by centrifugal force into the stationary clutch casing. This permits the returning springs 28, 28 to release the clutch or if returning springs are not used, the suction created behind the diaphragm, or other oil pressure operative member, draws it back thus releasing the clutch. This clutch can, therefore, be operated with no springs in the clutch except the small springs 28, 28 which return plate 25 to the open position when the clutch is not engaged and even these springs can be omitted as shown in Fig. 5.

In Fig. 5 is shown a revoluble clutch casing 80 attached to motor drive shaft B. Such casing 80 is formed with an oil pressure chamber 181 forming part of bore 81 which is connected with an oil pressure system through an oil pressure conductor 82 controlled by any kind of a valve such as M or 52. This revoluble clutch casing is in the nature of a cylinder with a bore 81 and packing 83 for a piston head member 84, having pins 85 slidable in holes 86, which forms an active clutch member in connection with the opposite ring shaped wall 87, similar to 24, for engaging and disengaging with the passive clutch member 88. This passive clutch member 88 is fixed to a slidable hub 89, similar to 8 in the diaphragm construction, and slidable on this is a collar 93 with a flange 94 against the outside of which presses the forked end 47 of an operating arm similar to 246.

Instead of a straight arm like 50, I show the rocking levers 66, 66 pivoted medially to the revoluble clutch casing 80 at 67, 67 with their other ends 68, 68 engaging the release valves O, O. In this construction, the free end 69 of each lever 66 is normally pressed outward as by a spring 98 which works against the action of the fork 47.

Ears 126 on clutch plate 25 in the construction shown in Figs. 2 and 3 slidable in grooves 226 compel the revoluble active clutch casing F to revolve with the clutch plate 25 and thus relieve the driving strain on the diaphragm G. While I show bearing pins 85 in the construction shown in Fig. 5, the friction between passive clutch member 88 and the wall 87 makes them less necessary. In this construction, the trough 31 is omitted as the oil level is maintained at the same height between the clutch casing and the motor casing through the medium of a connecting drain 65 near the bottom.

In Fig. 4 is shown a revoluble clutch member T which may be made of thin steel or some other light strong metal, all the parts being relatively thin. This is shown as controlled by an ordinary two way valve 52, instead of by a special valve M, and there is no storage tank, there being a separate oil pressure pump 54 instead of a connection with the oil pressure lubricating system.

In Fig. 7 is shown a clutch casing 70 in which is a clutch 71 relatively much smaller than in the other views, the bottom of the casing 70 being considerably above the bottom of engine casing 72. Through the drains or outlets 74 the oil discharged by the clutch flows by gravity back into the engine casing and to make this a dry clutch as far as the clutch plates are concerned, the revoluble clutch member 75 completely encloses the passive clutch member 76, there being a tight joint by packing or otherwise at 175 between active clutch 75 and hub 89 on clutch shaft 77. The inside of such a dry clutch can be of the diaphragm or piston type, but as the oil cannot get in to affect the active and passive clutch members, they can be of the dry type. In such a construction, no hole nor drain such as 64 is necessary.

While I find the use of an air storage tank such as T, connected to a special valve M, to be highly desirable and convenient, both may be omitted. I may use for emergencies if anything happens to the tank or for initial clutch engagement, if no tank is used, a hand pump, such as shown in Fig. 2 at 90.

This hand pump is preferably located in the crank case and is arranged to suck oil through pipe 91 and force it through pipe 92 to the clutch control valve wherever located and whatever type may be used.

Whether the regular oil pressure system in which the oil is sucked from the motor crank case and returned thereto, a special pump system such as shown in Fig. 4 where the oil is sucked from the clutch casing instead of from the crank case and is returned thereto either through the clutch or through a bypass and pressure relief valve such as 12 or a hand pump is used, the principle is to provide connections and pump means to remove the oil from the bottom of the clutch casing and circulate it through suitable conductors past a control valve to the clutch and, when the suitable valves are opened and closed, through the clutch and back into the fixed clutch casing by way of a positively operated rim oil release valve.

If a positive action oil pump is used, some sort of a pressure relief valve such as 12 should be provided, but any type of pump in which there is provision for limiting the oil pressure produced might be used.

I believe the provision of a pneumatic tank for storing a certain amount of oil pressure for operating a clutch is new.

As shown at 95 in Fig. 1, I find it wise, however, to provide a nipple with a cock 96 at the top of a tank such as T so that the air may be renewed or pressure may be produced therein by means of an air pump. In an emergency the hand oil pump 90 or air pump as just described can be used.

If for any reason there is no oil pressure anywhere and if the pressure does not start when the engine starts, the clutch will not work and the car will not move. This is a positive signal to the operator that the car should not move and that something is wrong with the oil circulating system.

If the motor will not start and the oil has left the tank for any reason, so that it is necessary to push or tow, the hand pump can be used to pump oil into the tank or to operate the clutch directly.

If the motor will start and run and is pumping oil, the clutch cannot fail to work.

I claim:

1. In a clutch, the combination of a driven shaft carrying a clutch plate; with a clutch casing carried by a drive shaft, said clutch casing including an oil pressure chamber of disk shape with its center substantially on the center of the drive shaft, said chamber being sealed by a diaphragm and there being a one direction oil outlet pressure release valve at the outside rim of the oil pressure chamber in a passage through the clutch casing; a source of oil pressure outside the clutch; a clutch control pipe from the oil pressure chamber to the source of oil pressure; a one direction oil inlet pressure valve outside the clutch in said clutch control pipe for controlling the flow of oil to the oil pressure chamber; and connections between the oil inlet pressure valve and the oil outlet pressure release valve whereby when one is opened the other is closed.

2. The combination in an automobile having a closed stationary clutch casing into which a motor crank drive shaft and an aligned clutch shaft project through bearings, and having means outside the stationary clutch casing for producing oil pressure in a casing oil control passage leading to the drive shaft bearing; a revoluble clutch casing carried by the drive shaft including a disk shaped oil pressure chamber with its center at the center of the shaft axis, there being a one direction oil outlet pressure release valve at the outside rim of the oil pressure chamber in a passage through the revoluble clutch casing; a diaphragm which seals the oil pressure chamber and operates an active clutch member; said active clutch member being in operative relation with a passive clutch member; said passive clutch member carried by and revoluble with the clutch shaft; a shaft clutch control oil passage from the oil pressure chamber through the drive shaft to the casing oil control passage; a one direction stationary oil inlet pressure valve in said casing oil control passage located in the stationary clutch casing outside the revoluble clutch casing for controlling the flow of oil to the oil pressure chamber in the revoluble clutch casing; and means to control both valves by opening one and by closing the other at the same time.

3. In a liquid operable clutch the combination of a stationary clutch casing into which a drive shaft and an aligned clutch shaft project through bearings; a casing oil control passage leading to the drive shaft bearing from a source of liquid pressure; a revoluble clutch casing carried by the drive shaft including a disk shaped liquid pressure chamber with its center at the center of the shaft axis, there being a one direction liquid outlet pressure release valve at the outside rim of the liquid pressure chamber in a passage through the revoluble clutch casing; a diaphragm which seals the liquid pressure chamber and operates an active clutch member; said active clutch member being in operative relation with a passive clutch member; said passive clutch member carried by and revoluble with the clutch shaft; a shaft clutch control liquid passage from the liquid pressure chamber through the drive shaft to the casing liquid control passage; a one direction stationary liquid inlet pressure valve in said casing liquid control passage located in the stationary clutch casing outside the revoluble clutch casing for controlling the flow of liquid to the liquid pressure chamber in the revoluble clutch casing; and means to control both valves by opening one and by closing the other at the same time.

4. In a liquid operable clutch the combination with a drive shaft and an aligned clutch shaft, each carried in a fixed bearing; of a liquid control passage leading to the drive shaft bearing from the source of liquid pressure; a revoluble clutch casing carried by the drive shaft including a disk shaped liquid pressure chamber with its center at the center of the shaft axis, there being a one direction liquid outlet pressure release valve at the outside rim of the liquid pressure chamber in a passage through the revoluble clutch casing; a diaphragm which seals the liquid pressure chamber and operates an active clutch member; said active clutch member in operative relation with a passive clutch member; said passive clutch member carried by and revoluble with the clutch shaft; a shaft clutch control liquid passage from the liquid pressure chamber through the drive shaft to the casing liquid control passage; a one direction stationary liquid inlet pressure valve in said casing liquid control passage for controlling the flow of liquid to the oil pressure chamber in the revoluble clutch casing; and means to control both valves by opening one and by closing the other at the same time.

RALPH H. KRESS.